United States Patent Office
2,842,568
Patented July 8, 1958

2,842,568
SYNTHESIS OF STEROIDS

Josef E. Herz and Josef Fried, New Brunswick, N. J., assignors to Olin Mathieson Chemical Corporation, New York, N. Y., a corporation of Virginia No Drawing. Application June 4, 1954
Serial No. 434,671

14 Claims. (Cl. 260—397.45)

This invention relates to the synthesis of valuable steroids; and has for its objects the provision of (I) an advantageous process of preparing steroids of the pregnane (including the pregnene and allopregnane) series, and of (II) certain compounds useful themselves as physiologically-active steroids and in the preparation of physiologically-active steroid derivatives.

The process of this invention comprises essentially (a) converting an 11β,21-dihydroxy steroid of the pregnane series into the corresponding 11β-hydroxy,21-alkanesulfonyloxy-derivative thereof, and (b) converting the latter into the corresponding $\Delta^{9(11)}$-21-bromo derivative or the corresponding 11β-hydroxy-21-chloro derivative or the corresponding 11β-hydroxy-21-acetoxy derivative or the corresponding 11β-hydroxy-21-unsubstituted derivative.

The $\Delta^{9(11)}$-21-bromo derivative may then be treated as disclosed in the U. S. application of Fried et al., Serial No. 434,672 filed on even date herewith and now Patent No. 2,763,671, granted September 18, 1956. The 11β-hydroxy-21-chloro derivatives are compounds which have mineralo- and glucocorticoid activity, and are therefore useful per se. They may also be dehydrated to the $\Delta^{9(11)}$-21-chloro derivatives which are disclosed in said application Serial No. 434,672. The 11β-hydroxy-21-acetoxy derivatives are known compounds which are also useful as starting materials in another aspect of this invention as more fully disclosed below. The 11β-hydroxy-21-unsubstituted derivatives are known compounds, which may be dehydrated to the $\Delta^{9(11)}$-21-unsubstituted derivatives.

The novel compounds of this invention comprise 11β-hydroxy-21-alkanesulfonyloxy-steroids of the pregnane series.

For a clearer understanding of the foregoing general and following detailed description of the invention, reference is made to the following schematic analysis:

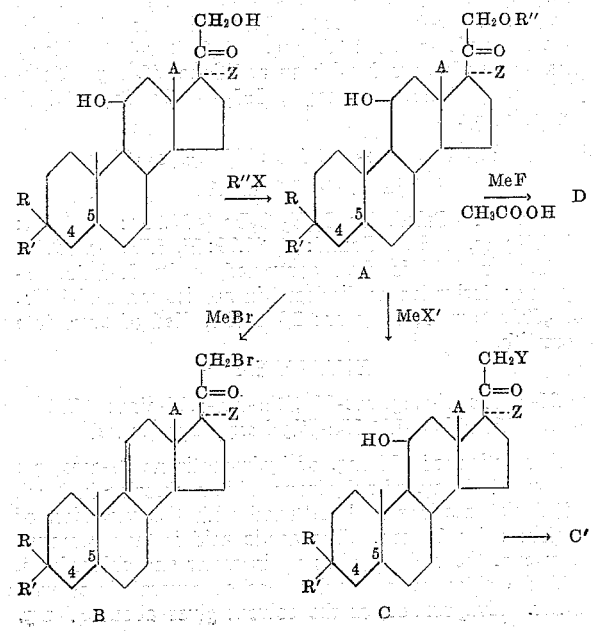

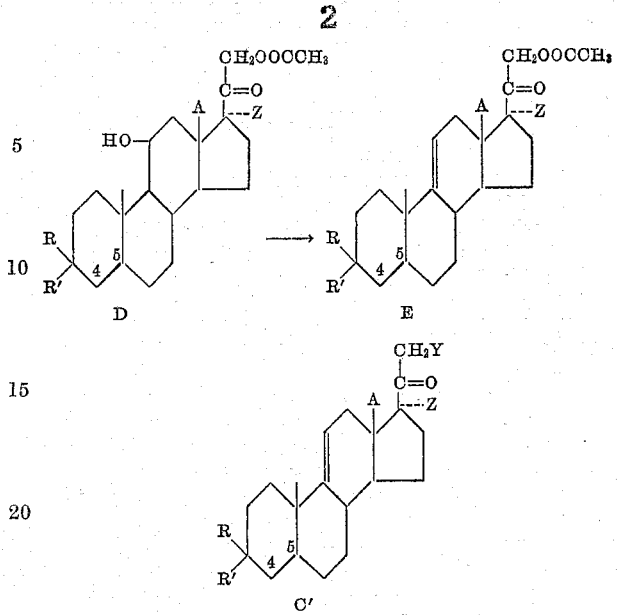

wherein the 4,5 position is double-bonded or saturated (the 4,5-double-bonded steroids being preferred), and wherein R is hydrogen, R' is hydroxy, or together R and R' is oxo (keto) or a group convertible thereto by hydrolysis (e. g. acetal), R and R' as oxo is preferred; Z is hydrogen or α-hydroxy; A is methyl or formyl radical (preferably methyl); R'' is an alkanesulfonyl radical [preferably a lower alkane sulfonyl, such as methanesulfonyl, ethanesulfonyl, hexanesulfonyl, etc. (methanesulfonyl being particularly preferred)]; X is chloro, bromo, or iodo; Me is a metal, such as an alkali metal or an alkaline earth metal, the halogen salt of which is soluble in the solvent employed in the indicated reaction, and is preferably an alkali metal, such as sodium or lithium; X' is chloro or iodo; and Y is hydrogen or chloro.

Compounds suitable as initial reactants in the process of this invention include hydrocortisone, corticosterone, 11β,21-dihydroxy-pregnane-3,20-dione, 11β,17α,21-trihydroxy-pregnane-3,20-dione, aldosterone, etc. These compounds are reacted with an alkanesulfonyl halide (sulfonyl chlorides are preferred, but other halides such as bromides and iodides may be used). Although any alkane sulfonyl chloride may be used, the alkane group is preferably a lower alkane, methanesulfonyl chloride (mesyl chloride) being particularly preferred. The reaction is carried out in accordance with the general method disclosed in U. S. application of Josef Fried, Serial No. 417,489, filed March 10, 1954, and in the following example, by reacting the steroid and sulfonyl halide in the presence of pyridine or other solvent.

This reaction results in the production of Compounds A wherein the alkanesulfonyl-oxy radical in the 21-position corresponds to the alkanesulfonyl halide used in the reaction.

Compounds A are then reacted with a metal halide. The steroid formed by the reaction depends on the halide chosen. If the reaction is carried out with a metal bromide (MeBr, wherein Me is as above-defined), $\Delta^{9(11)}$-21-bromo-derivatives are formed (Compounds B), which derivatives are disclosed in application Serial No. 434,672, now U. S. Patent 2,763,671, filed of even date herewith. This reaction is advantageously conducted in a suitable solvent in which the metal bromide is soluble. Such solvents include the lower alkanoic acids (particularly glacial acetic acid), certain alcohols, and ketones. The preferred metal bromides are alkali metal and alkaline earth metal bromides, such as lithium bromide, potassium bromide, calcium bromide, and barium bromide, which are soluble in the solvent.

If Compounds A are reacted with a metal chloride (MeCl, wherein Me is as above-defined), 21-chloro,11β-hydroxy derivatives (Compounds C, Y being chloro) are formed. The conditions for the reaction are the same as that for Compounds A and a metal bromide. Suitable metal chlorides include lithium chloride, beryllium chloride, and calcium chloride.

If Compounds A are reacted with a metal iodide (MeI, wherein Me is a above-defined), 21-hydrogen,11β-hydroxy derivatives (Compounds C, Y being hydrogen) are formed. The conditions for the reaction are the same as that for Compounds A and a metal bromide.

If Compounds A are reacted with a metal fluoride (MeF, wherein Me is as above-defined) in glacial acetic acid, 21-acetoxy-11β-hydroxy derivatives, Compounds D are formed.

Compounds C and D may then be reacted with various dehydrating agents to form the corresponding $\Delta^{9(11)}$-derivatives (Compounds C' and E). Suitable reagents for this dehydration step include, inter alia, metal bromides, such as the alkali metal bromides (e. g. lithium bromide), and certain acyl halides, particularly the sulfonyl halides (e. g. methanesulfonyl chloride). The reaction is carried out in a suitable solvent which depends on the dehydrating agent used. For dehydrating agents such as metal bromides, the lower alkanoic acids are particularly efficient solvents, glacial acetic acid being especially preferred. For dehydrating agents such as acyl chlorides (e. g. sulfonyl chlorides and carboxylic acid chlorides), organic nitrogen containing bases serve as suitable solvents, pyridine being particularly preferred.

The process of this invention is described in detail in the following schematic analysis and examples in connection with the use of hydrocortisone as a starting material, but is of course not limited thereto:

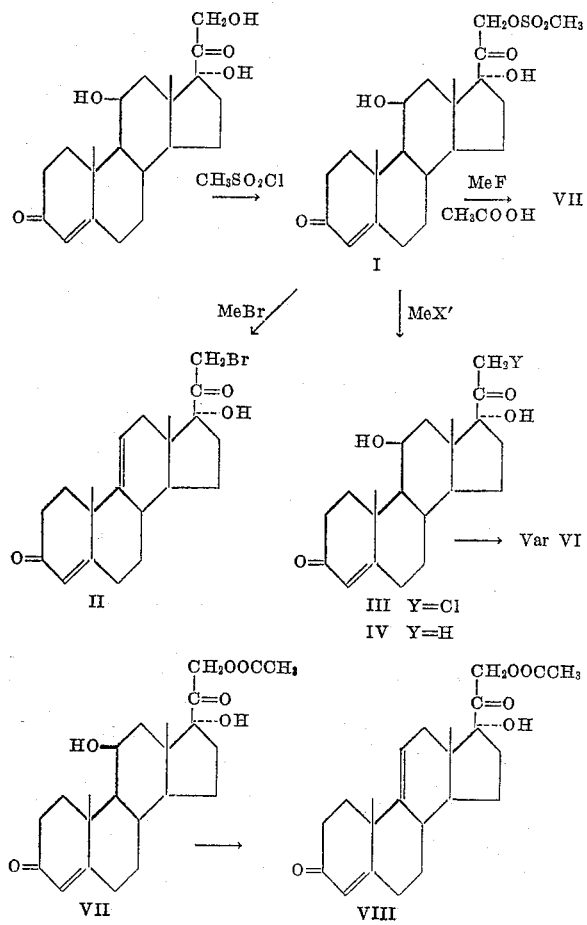

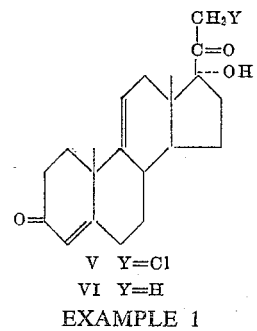

V Y=Cl
VI Y=H

EXAMPLE 1

*Compound F 21-mesylate (I) [hydrocortisone 21-mesylate]*

To a solution of 520 mg. of hydrocortisone (Compound F) in 10 ml. of dry pyridine cooled to 0° in an ice-bath is added 0.2 ml. of methane sulfonyl chloride (app. 2 equivalents) in 1 ml. of chloroform and the mixture is allowed to remain in the icebox for 3 hours. The excess methanesulfonyl chloride is destroyed by the addition of a small piece of ice, the mixture diluted with chloroform and washed free of pyridine with dilute hydrochloric acid and water. The solution is dried and evaporated to dryness in vacuo. The resulting syrup crystallizes readily and the crystals are leached with acetone and ether. About 502 mg. of colorless needles, M. P. 186–187° (dec.) are obtained. The mother liquor is concentrated and an additional 26 mg., M. P. 186–187° (dec.) is obtained. The total yield is about 84%, $[\alpha]_D +150°$ (c., 0.38 in chloroform), $\lambda_{max.}^{EtOH}$ 241 m$\mu$ ($\epsilon$=21,400), $\lambda_{max.}^{Nujol}$ 2.84, 2.92, 5.79, 6.04, 6.22 $\mu$

*Analysis.*—Calcd. for $C_{22}H_{32}O_7S$ (440.52): C, 59.98; H, 7.32; S, 7.28. Found: C, 60.29; H, 7.32; S, 7.08.

EXAMPLE 2

*21-bromo-$\Delta^{4,9(11)}$-pregnadiene-17α-ol-3,20-dione (II)*

500 mg. of hydrocortisone 21-mesylate (I), M. P. 186–187° (dec.) is dissolved, without further purification in 12 ml. of glacial acetic acid. To this is added 800 mg. of lithium bromide previously dried in vacuo at 100° C. The solution is refluxed with exclusion of moisture for 30 minutes, after which it is concentrated in vacuo. The resulting syrup is taken up in chloroform and washed acid-free with bicarbonate and water. After drying and evaporation of the solvent the compound crystallizes spontaneously. The crystals are leached with acetone-ether, leaving a residue which weighs about 338 mg., M. P. 189–191° (dec.). Recrystallization from acetone-ether yields about 251 mg., M. P. 200–201° (dec.) The mother liquors furnish an additional 52 mg. Total yield about 65% (300 mg.), $[\alpha]_D +115°$ (c., 0.36 in chloroform), $\lambda_{max.}^{EtOH}$ 239 m$\mu$ ($\epsilon$=16,400), 280 m$\mu$ ($\epsilon$=995)

$\lambda_{max.}^{Nujol}$ 2.97$\mu$, 5.82$\mu$, 6.12$\mu$

*Analysis.*—Calcd. for $C_{21}H_{27}O_3Br$ (407.35): C, 61.91; H, 6.68; Br, 19.62. Found: C, 61.79; H, 6.73; Br, 19.59.

Compound II is then converted to its 9α-halo,11β-hydroxy derivative as disclosed in application Serial No. 434,672, now U. S. Patent 2,763,671, filed of even date herewith.

EXAMPLE 3

*21-chloro-$\Delta^4$-pregnene-11β,17α-diol-3,20-dione (III) [21-chloro-11β,17α-dihydroxyprogesterone]*

A solution of 100 mg. of hydrocortisone 21-mesylate (I) and 200 mg. of anhydrous lithium chloride in 3 ml. of glacial acetic acid is refluxed with the exclusion of moisture for 1 hour. The acetic acid is then removed in vacuo, the residue taken up in water and chloroform, and the chloroform solution washed several times with water. Evaporation of the solvent gives about 77 mg.

of crystalline material; which on recrystallization from ethanol melts at 249–251° (dec.), $[\alpha]_D +161°$ (dioxane), $\lambda_{max.}^{EtOH}$ 241 m$\mu$ ($\epsilon$=16,700); $\lambda_{max.}^{Nujol}$ 2.90$\mu$, 3.10, 5.84$\mu$, 6.09$\mu$, 6.19$\mu$.

*Analysis.*—Calcd. for $C_{21}H_{29}O_4Cl$ (380.90): C, 66.21; H, 7.67; Cl, 9.31. Found: C, 66.45; H, 7.51; Cl, 9.10.

Compound III is a new steroid which has mineralo- and glucocorticoid activity.

EXAMPLE 4

*21-chloro-$\Delta^{4,9(11)}$-pregnadiene-17$\alpha$-ol-3,20-dione (V)*

The process of Example 2 is repeated with 21-chloro-11$\beta$,17$\alpha$-dihydroxy-progesterone (III) substituted for hydrocortisone 21-mesylate (I). After isolation and purification as in Example 2, 21-chloro-$\Delta^{4,9(11)}$-pregnadiene-17$\alpha$-ol-3,20-dione is obtained, which is identical in melting point and infrared spectrum with the corresponding steroid formed in application Serial No. 434,672, now U. S. Patent 2,763,671, filed of even date herewith.

EXAMPLE 5

*$\Delta^4$-pregnene-11$\beta$,17$\alpha$-diol-3,20-dione (IV)*
*[11$\beta$,17$\alpha$-dihydroxyprogesterone]*

A solution of 100 mg. of hydrocortisone 21-mesylate (I), and 400 mg. of sodium iodide in 6 ml. of glacial acetic acid is refluxed for 30 minutes. The solution soon assumes the brown iodine color. At the end of the reaction time, the acetic acid is removed in vacuo, the residue taken up in water and chloroform and the chloroform solution washed with sodium sulfite solution and water. After drying over sodium sulfate and evaporation of the solvent in vacuo, a 90% yield of $\Delta^4$-pregnene-11$\beta$,17$\alpha$-diol-3,20-dione is obtained.

EXAMPLE 6

*$\Delta^{4,9(11)}$-pregnadiene-17$\alpha$-ol-3,20-dione (VI)*

The process of Example 2 is repeated with 11$\beta$,-17$\alpha$-dihydroxy-progesterone (IV) substituted for hydrocortisone 21-mesylate (I). After isolation and purification as in Example 2, $\Delta^{4,9(11)}$-pregnadiene-17$\alpha$-ol-3,20-dione is obtained, which is identical in melting point and infrared spectrum with an authentic sample.

EXAMPLE 7

*Compound F 21-acetate (VII) [hydrocortisone 21-acetate]*

A solution of 100 mg. of hydrocortisone mesylate (I) and 70 mg. of sodium fluoride in 3 ml. of glacial acetic acid is refluxed for 1 hour 15 minutes. The reaction mixture is concentrated to dryness in vacuo and the residue taken up in chloroform and water. The chloroform solution is washed with water, dried over sodium sulfate and evaporated to dryness in vacuo. The residue (about 105 mg.) on recrystallization from acetone gives F acetate (VII) (about 10 mg.) M. P. 212–214°. Identity is established by mixture melting point and infrared comparison.

Compound VII may be dehydrated to $\Delta^{4,9(11)}$-pregnadiene-17$\alpha$,21-diol-3,20-dione 21-acetate (VIII) by the methods illustrated in the following examples:

EXAMPLE 8

*Dehydration of hydrocortisone acetate with lithium bromide*

A solution of 100 mg. of hydrocortisone acetate (VII) and 212 mg. of dry lithium bromide in 3 ml. of glacial acetic acid is refluxed with the exclusion of moisture for 45 minutes. The moderately brown solution is evaporated to dryness in vacuo, the residue dissolved in chloroform and washed repeatedly with water and bicarbonate. After drying and evaporation of the solvent in vacuo about 108 mg. crystalline material are obtained, which after 2 recrystallizations from ethyl acetate yields about 43 mg. of $\Delta^{4,9(11)}$-pregnadiene-17$\alpha$,21-diol-3,20-dione 21-acetate (VIII); M. P. 227–231°.

The same yield (about 43 mg., M. P. 232–235°) is obtained when the reaction is run for 30 minutes. The yield is lower when less lithium bromide is used, or the reaction time is further shortened.

EXAMPLE 9

*Dehydration of hydrocortisone acetate with methanesulfonyl chloride*

To a solution of 100 mg. of hydrocortisone acetate (I) in 5 ml. of dry pyridine is added 0.2 ml. of methanesulfonyl chloride. The mixture is allowed to stand in the icebox for 112 hours. The excess mesylchloride is then destroyed by addition of ice, the mixture taken up in chloroform, washed with water, 1 N HCl, bicarbonate and water, dried over sodium sulfate and evaporated to dryness in vacuo. The residue weighs about 118 mg. Repeated crystallization from ethanol yields about 18 mg. of $\Delta^{4,9(11)}$-pregnadiene-17$\alpha$,21-diol-3,20-dione 21-acetate (VIII), M. P. 231–234°; $[\alpha]_D +105°$ (c., 0.5 in chloroform).

This invention may be otherwise embodied within the scope of the appended claims.

We claim:

1. A compound selected from the group consisting of:

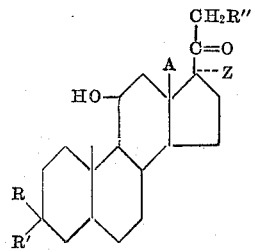

and

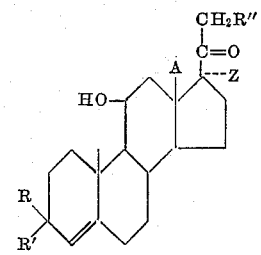

wherein R is hydrogen, R' is hydroxy and together R and R' is keto, Z is a radical selected from the group consisting of hydrogen and hydroxy; A is a radical selected from the group consisting of methyl and formyl; and R'' is a lower alkanesulfonyl-oxy radical.

2. Hydrocortisone 21-mesylate.

3. The process which comprises reacting an 11$\beta$-hydroxy-21-alkanesulfonyl-oxy-steroid of the pregnane series with a metal halide, and recovering the product formed thereby.

4. The process which comprises reacting an 11$\beta$-hydroxy-21-alkanesulfonyl-oxy-steroid of the pregnane series with a metal bromide, and recovering the $\Delta^{9(11)}$-21-bromosteroid formed thereby.

5. The process of claim 4, wherein the 11$\beta$-hydroxy-21-alkanesulfonyl-oxy-steroid is produced by reacting the corresponding 11$\beta$,21-dihydroxy-steroid with an alkanesulfonyl halide.

6. The process which comprises reacting an 11$\beta$-hydroxy-21-alkanesulfonyl-oxy-steroid of the pregnane series with a metal chloride, and recovering the 11$\beta$-hydroxy-21-chlorosteroid formed thereby.

7. The process which comprises reacting an 11$\beta$-hydroxy-21-alkanesulfonyloxy-steroid of the pregnane series with a metal iodide, and recovering the 11$\beta$-hydroxy-21-unsubstituted steroid formed thereby.

8. The process which comprises reacting an 11β-hydroxy-21-alkanesulfonyl-oxy-steroid of the pregnane series with a metal fluoride in the presence of acetic acid, and recovering the 11β-hydroxy-21-acetoxy-steroid formed thereby.

9. The process of claim 8 wherein the 11β-hydroxy-21-alkanesulfonyl-oxy-steroid of the pregnane series is hydrocortisone 21-mesylate.

10. The process which comprises reacting an 11β-hydroxy-21-alkanesulfonyl-oxy-steroid of the pregnane series with a metal chloride to form the corresponding 11β-hydroxy-21-chloro-steroid, and dehydrating said 11β-hydroxy-21-chloro-steroid to form the corresponding $\Delta^{9(11)}$-21-chloro-steroid.

11. The process of claim 10 wherein the 11β-hydroxy-21-alkanesulfonyl-oxy-steroid of the pregnane series is hydrocortisone 21-mesylate.

12. The process which comprises reacting an 11β-hydroxy-21-alkanesulfonyloxy-steroid of the pregnane series with a metal iodide to form the corresponding 11β-hydroxy-21-hydrogen-steroid, and dehydrating said 11β-hydroxy-21-unsubstituted steroid to form the corresponding $\Delta^{9(11)}$-21-unsubstituted steroid.

13. The process of claim 12 wherein the 11β-hydroxy-21-alkanesulfonyl-oxy-steroid of the pregnane series is hydrocortisone 21-mesylate.

14. Hydrocortisone 21-(lower alkane)sulfonate.

References Cited in the file of this patent

UNITED STATES PATENTS

| | | |
|---|---|---|
| 2,183,589 | Reichstein | Dec. 19, 1939 |
| 2,684,968 | Bergstrom | July 27, 1954 |
| 2,728,783 | Graber | Dec. 27, 1955 |
| 2,732,383 | Bernstein | Jan. 24, 1956 |

Disclaimer 2,842,568.—*Josef E. Herz* and *Josef Fried*, New Brunswick, N.J. SYNTHESIS OF STEROIDS. Patent dated July 8, 1958. Disclaimer filed Mar. 5, 1965, by the assignee, *Olin Mathieson Chemical Corporation*.
Hereby enters this disclaimer to claims 1, 2 and 14 of said patent.
[*Official Gazette May 18, 1965.*]